Figure 1:
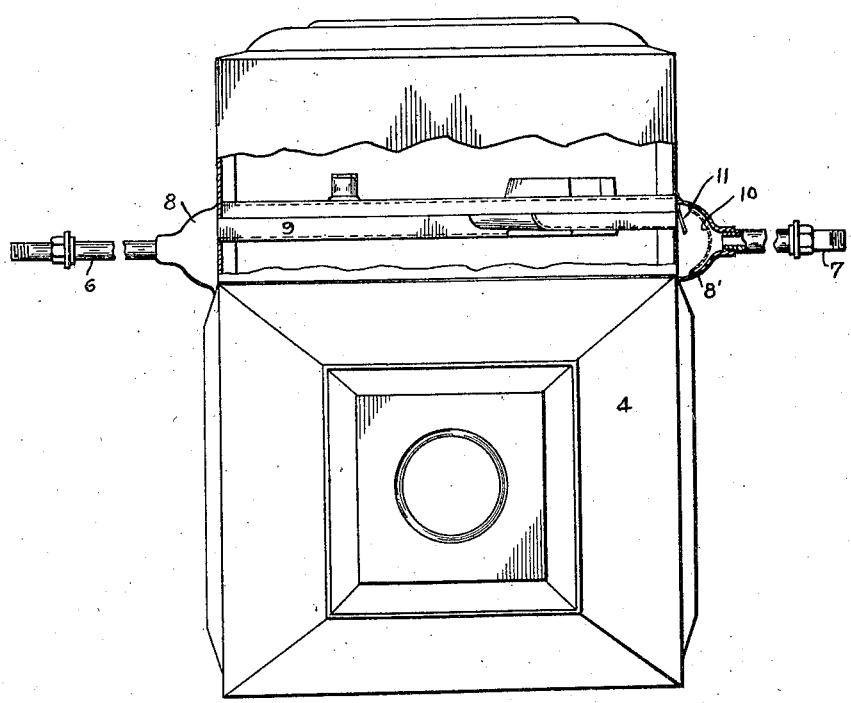

Oct. 2, 1923.

J. A. FARDY

GAS METER

Filed Nov. 22, 1922

1,469,216

2 Sheets-Sheet 1

Inventor
John A Fardy
By his Attorney

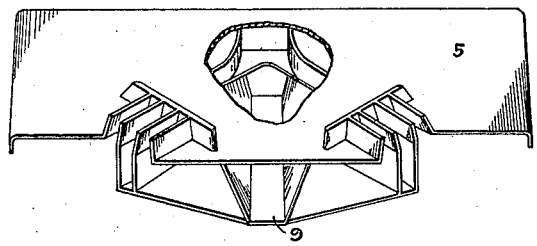
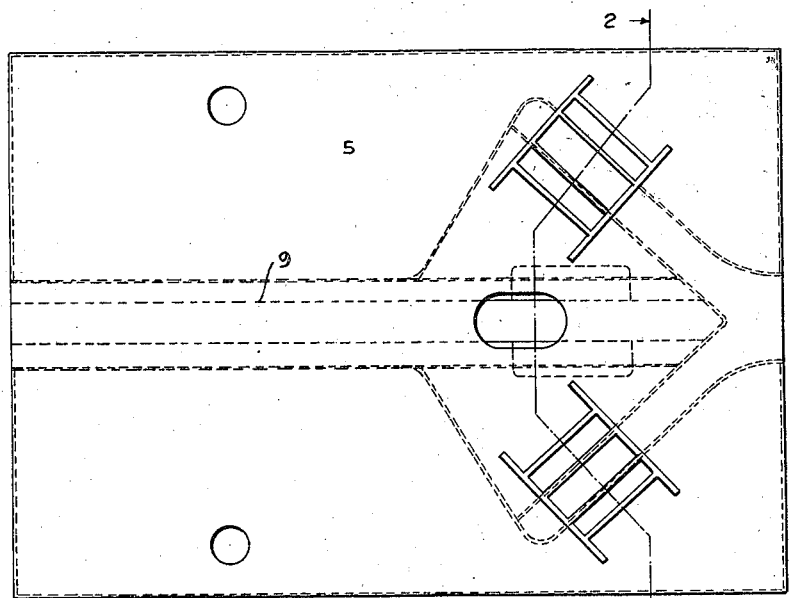

Patented Oct. 2, 1923.

1,469,216

UNITED STATES PATENT OFFICE.

JOHN A. FARDY, OF BROOKLYN, NEW YORK.

GAS METER.

Application filed November 22, 1922. Serial No. 602,502.

*To all whom it may concern:*

Be it known that I, JOHN A. FARDY, a citizen of the United States, residing at Brooklyn, in the county of Kings and State of New York, have invented certain new and useful Improvements in Gas Meters, of which the following is a specification, reference being had therein to the accompanying drawing.

My invention relates to improvements in gas meters, and more particularly has reference to means in combination with a standard type of meter of the class described for preventing the deposit of naphthaline and other heavy matter in the valves and other moving parts of the meter, while at the same time preventing tampering with the meter.

Referring to the accompanying drawings, I have illustrated in Fig. 1 in front elevation, parts being broken away, a suitable form of meter embodying an application of my invention. Fig. 2 is a perspective view partly in section illustrating part of the valve mechanism in the top of the meter, and Fig. 3 is a plan view looking down upon the same.

4 indicates the body of the meter within which the bags, etc., are mounted, and 5 the platform or valve table in the upper part thereof and upon which the valves are mounted. 6 indicates the service inlet, and 7 the house outlet to and from the meter respectively, the same being connected to the meter by a cup-like chamber 8 hereinafter more fully referred to.

Heretofore it has been customary to connect the duct or passage 9 at opposite sides of the meter to service pipes extending upwardly above the meter, the result being that naphthaline and other heavy deposits entering the meter pass through the duct or channel 9 to the valves and other working parts of the meter interfering with the operation of the same and causing an accumulation of water and other material within the meter, making it necessary to disconnect and drain the meter from time to time, whereas according to the preferred application of my invention, cups or chambers such as 8 are suitably and preferably secured upon opposite sides of the meter as shown in Fig. 1 so that the centres are below the channel or duct 9, the result being that gas entering from the street through the service connection 6 leaves all condensate, sediment, water or other deposit in the lower part of the cup or saucer 8, leaving a clear passage for the gas to enter the duct 9, the same passing into the house by way of a similar saucer or cup-like chamber 8' which is also provided with a gauze or screen 10 through which the gas passes in entering the house.

11 indicates a flap valve which may be provided with a piece of leather or other soft material on the inside of which hanging by gravity normally closes the outlet end of the duct 9, but beneath which the gas readily passes in entering the house.

The naphthaline or other deposit accumulates in the bottom of the cup-like structure 8 usually evaporates and passes into service, enriching the gas instead of passing in while in the thick liquid state interfering with the operation of the meter. Should the accumulation be excessive it is a simple matter to disconnect and remove the same without upsetting the meter.

The pivoted flap valve 11 prevents wires and other implements being used for tampering with the meter, and even if the valve were not there, a wire could not be inserted for the reason that the line of the duct 9 and pipe 7 or 6 are in different levels so that the wire would not only have to be kinked or bent twice, but would have to be bent a third time in order to reach the valve in the meter, an utter impossibility. The flap valve, however, serves the additional advantage of preventing undue pressures applied in the house service when testing the line, such pressures frequently injuring the interior mechanism of the meter.

Of course it will be understood that various modifications may be made in the construction and arrangement of parts without departing from the spirit of the invention as claimed.

I claim:

1. In combination with a meter of the class described, a connection between the meter and the pipes connecting therewith comprising a concave structure within which sediment may be accumulated, and a flap valve hinged within said structure normally closing communication between the same and the interior of said meter.

2. In combination with a meter of the class described, a connection between the meter and the pipes connecting therewith comprising a concave structure within which sediment may be accumulated, and a flap valve hinged within said structure normally closing communication between the same and the interior of said meter, and a screen within said structure.

In testimony whereof I hereunto affix my signature.

JOHN A. FARDY.